A. AICHELE.
DIFFERENTIAL GEAR FOR MOTOR CARS.
APPLICATION FILED JAN. 5, 1918.
1,301,800. Patented Apr. 29, 1919.
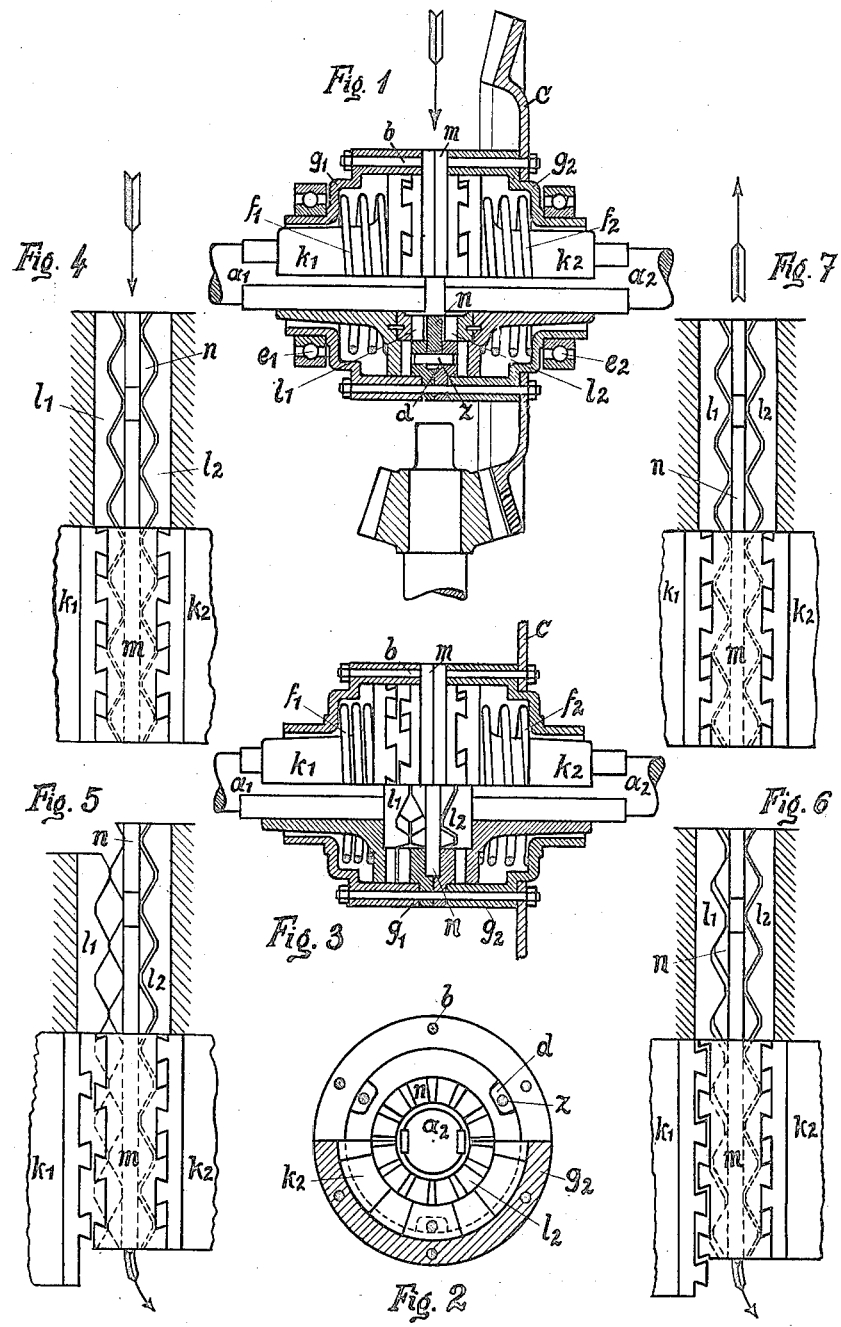

UNITED STATES PATENT OFFICE.

ALBERT AICHELE, OF BADEN, SWITZERLAND.

DIFFERENTIAL GEAR FOR MOTOR-CARS.

1,301,800. Specification of Letters Patent. Patented Apr. 29, 1919.

Application filed January 5, 1918. Serial No. 210,539.

*To all whom it may concern:*

Be it known that I, ALBERT AICHELE, a citizen of the Swiss Republic, residing at Wiesenstrasse, Baden, Switzerland, have invented certain new and useful Improvements in Differential Gears for Motor-Cars, of which the following is a specification.

This invention has for its object to provide a differential gear without toothed wheels, which is designed to replace the differential gears hitherto in use. The chief object of the improved gear is to couple together the two wheels of the hind axle in normal circumstances, while allowing however each wheel freedom of motion and capability of motion relatively to the other wheel, in the manner required when traveling around curves. In addition to this main object the present invention has the further object of providing a differential gear of simpler and cheaper construction than that of the differential gears with toothed wheels hitherto employed. A further object of the invention is to reduce the bulk of the gear while also utilizing the material with such efficiency as to considerably reduce the stressing of the said material below the specific stresses that are at present permissible in differential gears with toothed wheels, and which act greatly in prejudice of their durability, and which cannot be avoided if the dimensions are to remain within the permissible limits.

The coupling together of the two hind wheels in such a manner that they shall make the same number of revolutions even when they are transmitting different powers, is found more and more to be a necessity the more motor-cars are employed in uneven country and on ground of non-uniform adhesion. In differential gears the drawback has been felt for a long time back that the wheel that happens to be revolving in the air or upon slippery ground will revolve at high speeds and then on striking the ground or gripping it again suddenly, is subjected to strains that are absolutely ruinous to the rubber tires. It is still worse when, while one wheel is racing on slippery ground, the other wheel gradually slows down until it even stops so that the car is unable to move either forward or backward.

On the other hand a permanently closed coupling is not permissible because in traveling around curves the outer wheel will revolve faster on account of the longer distance it has to travel, so that it is necessary that each wheel must be able to move relatively to the other.

Compensating gears without toothed wheels have already been proposed wherein the coupling of the wheels is effected with equal distances of travel, while allowing of their individual freedom of motion with different distances of travel. Such gears consist in the combination of two claw clutches of which the one or the other clutch is automatically disconnected when the car is traveling around a curve. All these known clutch gears have, however, drawbacks which have hitherto prevented their introduction into practical use.

Those drawbacks are avoided by the improved differential gear of the present invention.

In this improved gear for each hind axle there are provided two claw clutches arranged concentrically, the faces of the claws of one clutch being straight or slightly backed-off, while the other clutch has claws the faces of which are inclined in such a manner as to exclude self-jamming. The clutch with straight-faced claws serves to transmit the driving power to the wheel axles, while the clutch with the inclined-faced claws serves to disengage the straight-faced claws in the axial direction in opposition to the pressure of a spring in cases where differences occur in the speed of the two wheel axles.

This invention will now be described more particularly with reference to the accompanying drawings which illustrate a constructional example of the present invention.

In these drawings:

Figure 1 is in its lower half a complete longitudinal section of the improved gear, and in its upper half is a section only of the casing, the clutch $k_1$—$m$—$k_2$ being shown in elevation.

Fig. 2 is in its upper half a plan of the center part $l$ of the inner clutch, and in its lower half a similar view after removal of the center parts $n$ and $m$.

Fig. 3 is a longitudinal section similar to Fig. 1 showing the position of the parts in traveling around a curve; in the lower half the clutch $l_1$—$n$—$l_2$ is shown in elevation, Figs. 4 to 7 are developments of the clutches in various positions of operation. In the upper half of each of these figures the outer clutch having straight-faced claws is omitted.

Fig. 4 shows the position when the wheel is traveling ahead in a straight line under load.

Figs. 5 and 6 show the positions when the wheel is traveling around a left curve, and Fig. 7 shows the position when the wheel is traveling backward in a straight line.

$a_1$ and $a_2$ are the axles of the two hind wheels; they are provided in the usual manner with grooved ends upon which are slidably mounted the claw clutch halves $k_1$ and $k_2$ having claws that are slightly backed-off. $f_1$ and $f_2$ are springs for pressing the said halves against the middle claw member $m$ which is composed of two halves and which is connected by bolts $b$ to the large bevel wheel $c$ of the hind axle drive. The driving power is therefore transmitted by the said center member $m$. The claws of the clutches $k_1$—$m$ and $k_2$—$m$ do not engage exactly with one another, but with a certain amount of play which allows of, when the clutch is closed, having a small amount of relative rotation between $k_1$, $m$ and $k_2$.

Inside the aforesaid claw clutch $k_1$ $m$, $k_2$ there is located a second clutch $l_1$ $n$ $l_2$ having inclined claws, the angle of the inclination being however so small as to exclude any self-jamming. $l_1$ is rigidly connected to $k_1$ and $l_2$ is rigidly connected to $k_2$. The center member $n$ made in one piece is capable of rotating in the center member $m$ but only to the extent allowed by the slots $d$ and the pins $z$, that is to say, only to the extent which is equal to the amount of play between the backed-off claws of the clutch $k_1$—$m$—$k_2$.

The entire mechanism is inclosed in a divided casing $g_1$ $g_2$ which is rigidly connected by the bolts $b$ to the center member $m$ and the toothed wheel $c$, and is mounted in the usual manner at both ends in ball bearings $e_1$ $e_2$. The centering of the axles $a_1$ and $a_2$ and of the various clutch parts is effected by their full bearing against the cylindrical inside surface of the casing and by shoulders. All the parts work in oil which can be charged into the casing until it flows out of the side orifices.

The operation of the improved differential gear will be best understood by considering the various conditions of traveling with reference to the figures:

(1) *Traveling in a straight line ahead under load.* (Figs. 1 and 4).—The claws of the center member $m$ bear fully against the claws of $k_1$ and $k_2$, and both wheels move with the same speeds of rotation independently of the distribution of the power, that is to say, of the friction between the wheel and the ground. The clutch $l_1$ $n$ $l_2$ is in engagement at both ends but is not transmitting any power.

(2) *Traveling ahead in a curve under load*, Figs. 3, 5 and 6.)—Assuming the car to be traveling around a left curve, the right hand wheel has a tendency to gain on the left wheel. This would be quite possible within the limits of the play between the claws of $k_1$ and $m$. As soon as $k_1$ begins to advance relatively to $m$, the clutch $l_1$ $n$ comes into operation. While in this case also the part $l_1$ which is rigidly connected to $k_1$, is advancing relatively to $n$, the inclined faces effect a pushing in the axial direction of the part $l_1$, and consequently of the part $k_1$, away from the central plane, in such a manner that the claws of $k_1$ are lifted on to or over the claws of $m$ (Fig. 5). As the right wheel continues to gain, the clutch $l_1$ slips over the inclined faces again into a fresh position of engagement with $n$; the claws of $k_1$ move away from the claws of $m$, and finally snap into the next space between the claws (Fig. 6). Then the operations begin anew.

(3) *Traveling backward*, (Fig. 7.)—In passing from forward travel to backward travel, the claws of the center member $m$ engage with the other flanks of the claws of $k_1$ and $k_2$. The clutches $l_1$ and $l_2$ retain their position relatively to $k_1$ and $k_2$. The clutch $l_1$ $n$ $l_2$ also remains in engagement because $m$ revolves freely around $n$. The pins $z$ will come up against the ends of the slots $d$ only when the claws of $m$ bear upon the rear flanks of the claws of $k_1$. The various parts have now for rearward travel exactly the same relative position to one another as they had for forward travel, and therefore the mechanism operates in exactly the same manner as is described above under (1) and (2).

(4) *Traveling without load*, (on a gradient.)—In this case both wheels have absolute freedom of rotation; they can both rotate at the same speed or one can gain on the other. It is conceivable that the clutch $l_1$ $n$ is lifted up (as in Fig. 5), and at the same time the clutch $l_2$ $n$ comes into the same position. The whole system $l_1$ $n$ $l_2$ and the likewise disengaged clutches $k_1$ and $k_2$ can then rotate inside $m$ without engaging again. To prevent this is the particular function of the stop pins $z$ in the slots $d$ which allow $n$ to make only a limited relative movement inside $m$.

From a constructional point of view it is to be noted that the loads are distributed in each case over a number of parts that are engaged at the same time, so that only a slight stressing of the material is produced which is much below the stressing that is permissible in the case of ordinary differential gears. This advantage increases the life of the gear. The gear is protected from dust and water. The lubrication is excellent and yet simple. The oil enters the spaces between the claws and has a damping action. Since the spaces between the claws of the clutch $k_1$—$m$—$k_2$ form chambers which are closed outwardly by the casing $g_1$ $g_2$ and inwardly by the clutch halves $l_1$ $l_2$, and since the said chambers are at least partially filled with oil, there is no fear of the clutch parts striking suddenly against each other and rattling, because the various inclosed bodies of oil act as liquid buffers. The improved gear therefore works smoothly and noiselessly.

What I claim is:—

1. In a motor car differential gear without toothed gear wheels, the combination with each half of a divided hind wheel axle, of a set of two claw clutches located concentrically to each other, and a spring having a constant tendency to keep said clutches in engagement, one clutch of each set having approximately straight-faced claws for transmitting the driving power to its respective hind wheel axle half, and the other clutch of the same set having inclined-faced claws whose face-inclination is such as will prevent self-jamming, and also open the straight-faced claw clutch axially against said spring whenever the two hind wheels are revolving at different speeds.

2. The combination with a driving member and a driven member of two claw clutches located concentrically to each other, and resilient means having a constant tendency to keep said clutches in engagement, one clutch having approximately straight-faced claws for transmitting the driving power, and the other clutch having inclined-faced claws whose face-inclination is such as will prevent self-jamming, and also open the straight-faced claw clutch axially against said spring whenever the driven member increases its speed in respect to the driving member, the circular angular dimensions of the spaces between the claws of said straight-faced claw clutch being at least equal to the angles inclosed by the inclined claw faces of the inclined-faced claw clutch.

3. The combination with a driving member and a driven member, of two claw clutches located concentrically to each other, and resilient means having a constant tendency to keep said clutches in engagement, one clutch having approximately straight-faced claws for transmitting the driving power, and the other clutch having inclined-faced claws whose face-inclination is such as will prevent self-jamming, and also open the straight-faced claw clutch axially against said spring whenever the driven member increases its speed in respect to the driving member, the axial length of the claws of the inclined-faced claw clutch being greater than the axial length of the claws of the straight-faced claw clutch.

4. In a motor car differential gear without toothed gear wheels, the combination with each half of a divided hind wheel axle, of a set of two concentric claw clutches and a spring having a constant tendency to keep said clutches in engagement, one clutch of each set having approximately straight-faced claws for transmitting the driving power to its respective hind wheel axle half, and the other clutch of the same set having inclined-faced claws whose face-inclination is such as will prevent self-jamming and also open the straight-faced claw clutch axially against said spring whenever the two hind wheels are revolving at different speeds, the two axially inner clutch halves of each clutch being located respectively back to back so as to constitute two central clutch devices each composed of two relatively rotatable parts, and stops for limiting said relative rotation.

5. In a motor car differential gear without toothed gear wheels, the combination with each half of a divided hind wheel axle and a driving toothed wheel for one hind wheel axle half, of a set of two concentric claw clutches and a spring having a constant tendency to keep said clutches in engagement, one clutch of each set having approximately straight-faced claws for transmitting the driving power to its respective hind wheel axle half, and the other clutch of the same set having inclined-faced claws whose face-inclination is such as will prevent self-jamming and also open the straight-faced claw clutch axially against said spring whenever the two hind wheels are revolving at different speeds, the two axially inner clutch halves of each clutch being located respectively back to back so as to constitute two central clutch devices each composed of two relatively rotatable parts, and stops for limiting said relative rotation, the central clutch device composed of the two straight-faced claw clutches being rigidly connected to said driving wheel.

6. In a motor car differential gear without toothed gear wheels, the combination with each half of a divided hind wheel axle, of a set of two claw clutches located concentrically to each other, and a spring having a constant tendency to keep said clutches in engagement, the outer clutch of each set having approximately straight-faced claws for transmitting the driving power to its respective hind wheel axle half, and the inner clutch of the same set having inclined-faced claws whose face-inclination is such as will prevent self-jamming, and also open the straight-faced claw clutch axially against said spring whenever the two hind wheels are revolving at different speeds, and a casing for the gear, whereby, the claws of the straight-faced claw clutches when they are in engagement, will form with said casing and the parts of the inclined-faced claw clutches, spaces adapted to be filled in whole or in part with oil that will have a damping action to prevent shocks and violent impact between the parts of the gear.

7. A power transmitter including a driving member for rotation in either direction, a pair of co-axial driven members, a clutch member connected to said driving member, and presenting two oppositely facing sets of straight-faced claws and two oppositely-facing sets of inclined faced claws, a pair of clutch members on opposite sides of said first mentioned clutch member, one connected to each driven member, and each having two sets of claws for engagement with the opposed claws of the first mentioned clutch member, and means for resiliently holding all said clutch members together but permitting the axial movement of either of said second mentioned clutch members in respect to the first mentioned clutch member upon increase in speed in respect to said first mentioned clutch member.

In testimony whereof I have signed my name to this specification.

ALBERT AICHELE.